(12) United States Patent
Breeze

(10) Patent No.: US 12,510,114 B2
(45) Date of Patent: Dec. 30, 2025

(54) MOUNTING FOR BEARING ASSEMBLY

(71) Applicant: Bowman International Limited, Abingdon (GB)

(72) Inventor: Ian Breeze, Oxfordshire (GB)

(73) Assignee: Bowman International Limited, Abingdon (GB)

( * ) Notice: Subject to any disclaimer, the term of this patent is extended or adjusted under 35 U.S.C. 154(b) by 0 days.

(21) Appl. No.: 17/686,945

(22) Filed: Mar. 4, 2022

(65) Prior Publication Data
US 2023/0279901 A1 Sep. 7, 2023

(51) Int. Cl.
F16C 23/08 (2006.01)
F16C 35/077 (2006.01)

(52) U.S. Cl.
CPC .......... F16C 23/084 (2013.01); F16C 35/077 (2013.01)

(58) Field of Classification Search
CPC ........ F16C 23/06; F16C 23/08; F16C 23/082; F16C 23/084
See application file for complete search history.

(56) References Cited

U.S. PATENT DOCUMENTS

| 5,857,782 | A | * | 1/1999 | Waskiewicz | F16C 19/525 384/493 |
| 10,105,747 | B2 | | 10/2018 | Breeze | |
| 10,252,320 | B2 | | 4/2019 | Breeze | |
| 10,294,992 | B2 | | 5/2019 | Breeze | |
| 10,434,563 | B2 | | 10/2019 | Breeze | |
| 10,654,090 | B2 | | 5/2020 | Breeze | |
| 10,661,327 | B2 | | 5/2020 | Breeze | |
| 10,717,125 | B2 | | 7/2020 | Breeze | |
| 10,724,577 | B2 | * | 7/2020 | Hadden | F16C 19/26 |
| 10,906,085 | B2 | | 2/2021 | Breeze | |
| 11,203,051 | B2 | | 12/2021 | Breeze | |
| 2016/0178000 | A1 | | 6/2016 | Docimo | |
| 2018/0149198 | A1 | | 5/2018 | Breeze | |

FOREIGN PATENT DOCUMENTS

| DE | 202020100724 U1 * | 6/2021 | ............. F16C 19/06 |
| EP | 3153729 A1 | 4/2017 | |
| GB | 554981 A | 7/1943 | |
| KR | 20090081183 A | 7/2009 | |
| WO | 2019058090 A1 | 3/2019 | |

OTHER PUBLICATIONS

Translation of DE202020100724 obtained May 5, 2025.*
European Search Report of EP23159832A, dated Jan. 12, 2024, 2 pages.
European Patent Application No. 23159832.7, European Examination Report, Jul. 29, 2025, 9 pages.

* cited by examiner

Primary Examiner — James Pilkington
(74) Attorney, Agent, or Firm — Ryan, Mason & Lewis, LLP

(57) ABSTRACT

A bearing assembly structure includes a bearing assembly comprising an outer surface having a convex profile and a seating ring having an inner surface having a concave profile. A bearing is fitted within the seating ring such that the convex profile of the outer surface of the bearing assembly fits within the concave profile of the inner surface of the seating ring.

18 Claims, 8 Drawing Sheets

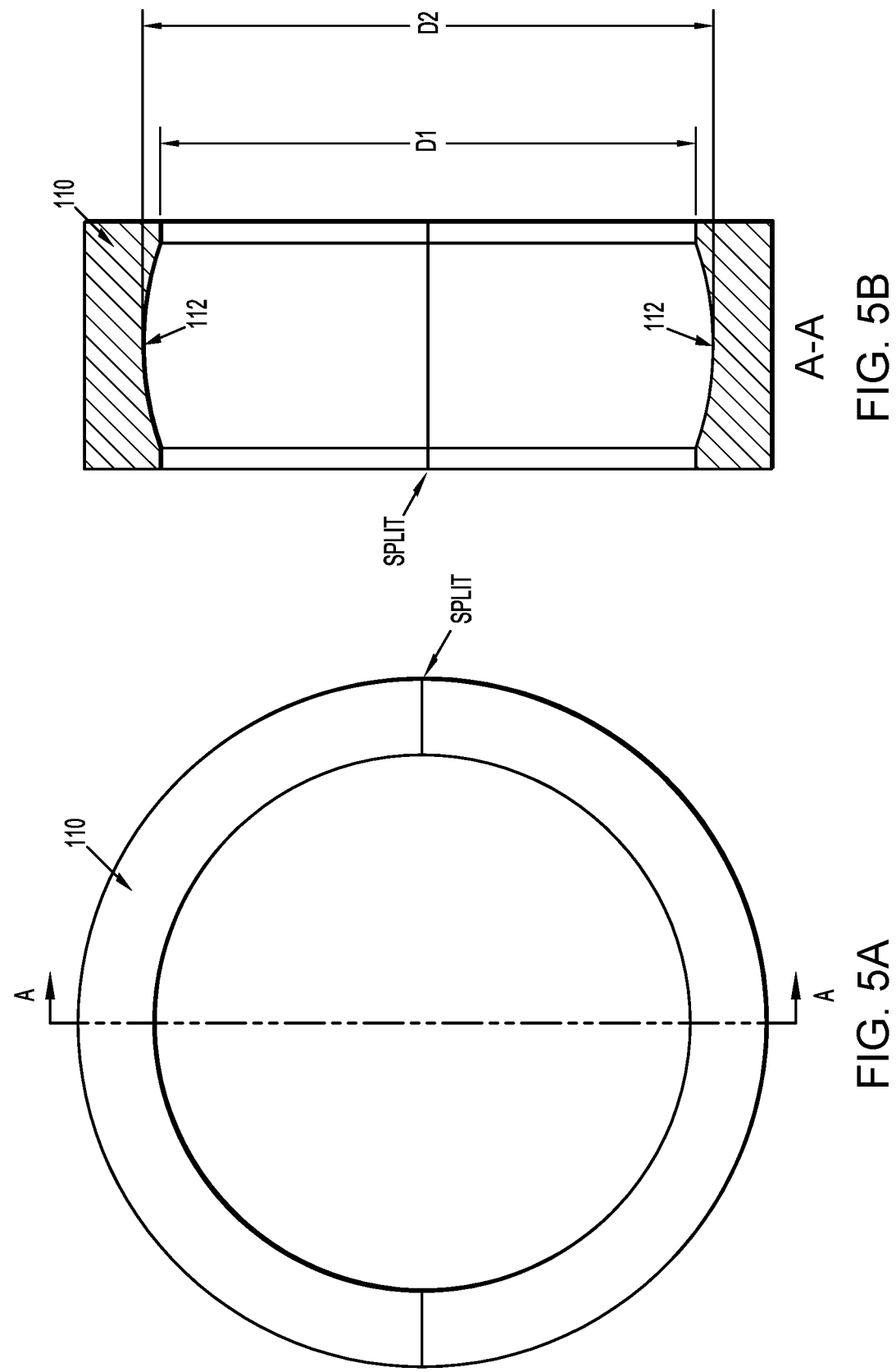

MOUNTING FOR BEARING ASSEMBLY

BACKGROUND TO THE INVENTION

Field of the Invention

The invention relates to an improved design for a bearing assembly.

Description of the Related Art

It is known in the art to provide bearing assemblies, such as free and fixed rolling element bearing assemblies, which are positioned in use around a shaft.

Example applications of such assemblies include, but are not limited to, marine engine transmission, automotive transmission, truck transmissions, agricultural and construction equipment, pumps and compressors, and two-cycle engines such as marine outboards and garden equipment.

It is known that shaft misalignment is typical in rotating equipment, particularly in long rotating shafts.

An aim of the invention is to provide an improved mounting for a bearing assembly.

SUMMARY OF THE INVENTION

There is disclosed a seating ring for a bearing assembly, comprising an inner circumference having a concave profile from an outer edge of the ring to an inner edge of the ring, wherein the bearing assembly has a convex profile on an outer surface thereof.

The seating ring is preferably a split seating ring comprised of two or more parts, for fitting around a bearing assembly.

There is disclosed a bearing assembly structure, comprising: a bearing assembly comprising an outer surface having a convex profile; a seating ring having an inner surface having a concave profile, wherein the bearing is fitted within the seating such that the convex profile of the outer surface of the bearing assembly fits within the concave profile of the inner surface of the seating ring.

The bearing assembly may be for fitting around a shaft, the fit between the bearing assembly and the seating room allowing for adjustment to compensate for shaft misalignment.

The bearing assembly may comprise: an inner race for attaching to a rotating shaft; a cage and rolling element assembly positioned around the inner race; a housing around the bearing assembly forming an outer race for the cage and rolling element assembly.

The bearing assembly may further comprise first and second positional locators for positioning the cage and rolling element assembly between inner edges thereof.

The bearing assembly structure may further comprise a thrustwasher adjacent an outer edge of either the first or second positional locator and fixably connected to the housing. The bearing assembly structure may further comprise a further thrustwasher respectively adjacent another outer edge of the first and second positional locator and fixably connected to the housing.

The first and second positional locators may comprise first and second protrusions on the inner race. The first and second positional locators may comprise first and second clamping rings for clamping the inner race to the rotating shaft. The first and second positional locators may comprise circumferential protrusions around the inner race, the protrusions being spaced apart from each other by a distance to accommodate the cage and rolling element assembly.

The cage and rolling element assembly may be rotatable with respect to the inner race.

The inner race may be provided with a circumferential protrusion between the first and second positional locators to provide a diameter dimension to accommodate the cage and rolling element assembly.

The thrustwasher may have an outer circumference with a first diameter and an inner circumference with a second diameter smaller than the first, the inner circumference of the thrustwasher being smaller than an outer circumference of a positional locator, wherein the positional locator is shaped to allow the thrustwasher to be located adjacent the positional locator and around the inner race.

The bearing assembly may comprise a set or parallel rollers.

There may be further provided an outer race between the cage and rolling element assembly and the housing, which is fixed to the housing, wherein the outer race is formed of a first material and the housing is formed of a second, different material.

The outer race may protrude from the housing to engage with rollers of the rolling element assembly.

The rollers of the rolling element assembly may engage an inner surface of the housing, the housing being formed of a material suitable for engagement with rollers of the rolling element assembly. An outer race may be integrated in the housing, with the outer race and housing being formed of the same material, the outer race being the portion of the housing with which the rollers engage.

There is disclosed a housing for a roller bearing cage comprised of a material to facilitate an outer race for the roller bearing cage.

BRIEF DESCRIPTION OF THE DRAWINGS

The invention is described by way of example to the accompanying drawings in which:

FIGS. 5A and 5B illustrate the seating ring of FIG. 3 or FIG. 4;

DESCRIPTION OF PREFERRED EMBODIMENTS

The invention is now described with reference to examples and embodiments.

Figure 1:
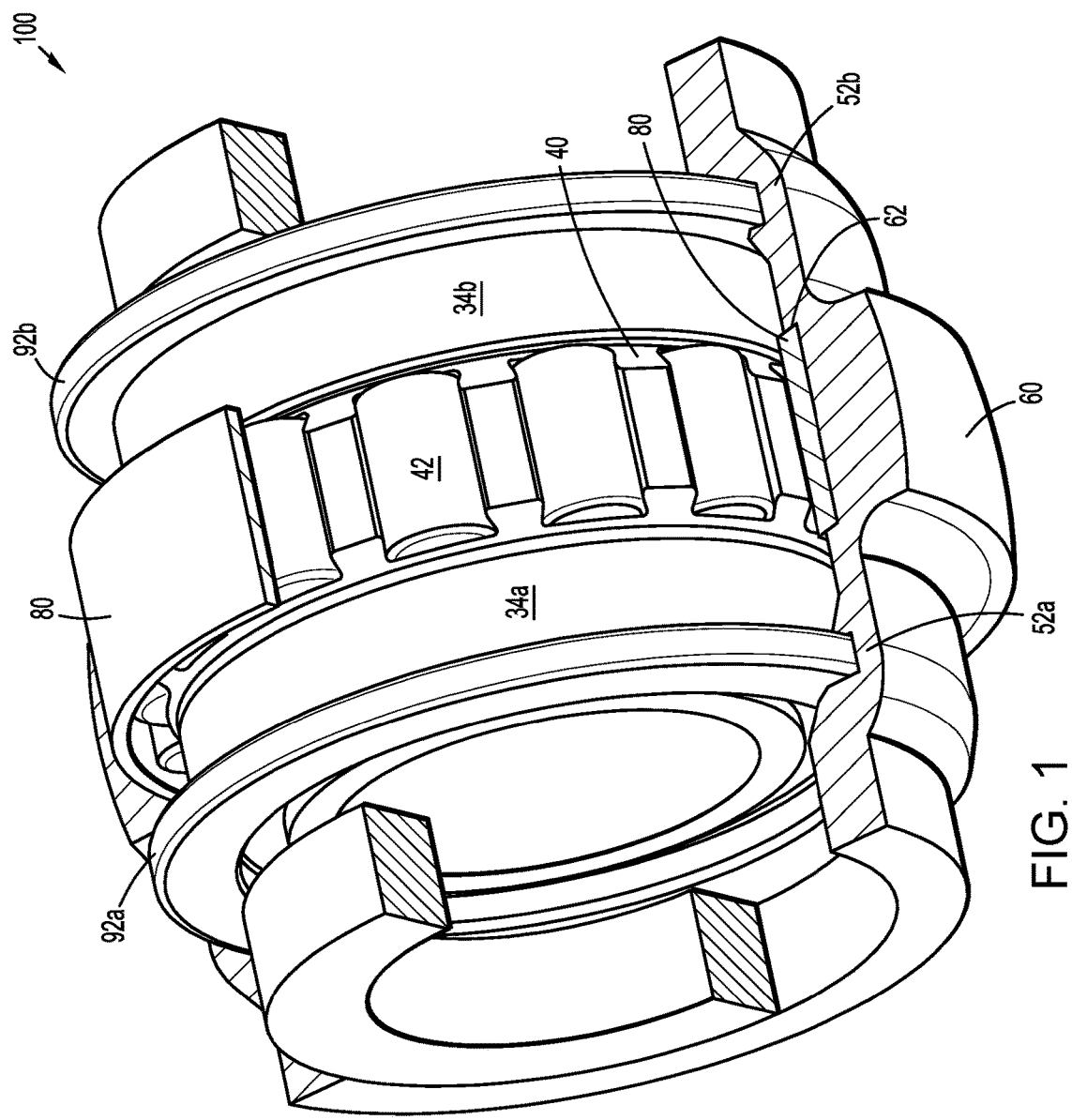
FIG. 1 illustrates a perspective view of part of an exemplary free rolling element bearing assembly.

With reference to FIG. 1 there is shown an example known bearing assembly 100 as described in U.S. Pat. Nos. 10,105,747, 10,717,125, 10,252,320, 10,654,090, 10,434, 563, 10,661,327, 10,906,085, 11,203,051 the contents of all of which are incorporated herein by reference.

Figure 2:
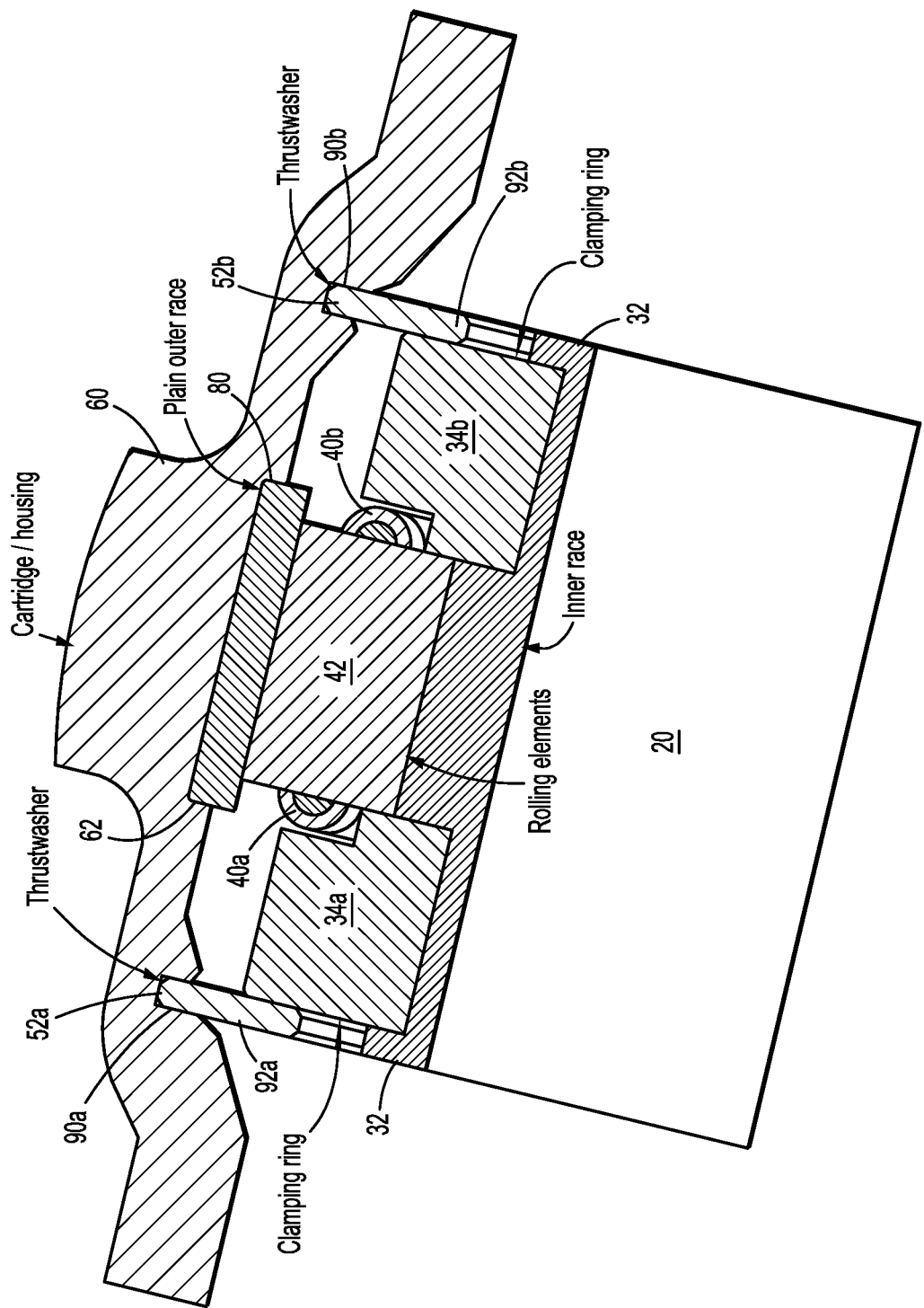
FIG. 2 illustrates a cross-sectional view of the free rolling element bearing assembly of FIG. 1.

FIG. 2 illustrates a cross-sectional view of the arrangement of FIG. 1, formed around a shaft 20. Some detail of this cross-sectional view is eliminated for ease of understanding. Only the top part of the cross-sectional view is shown in FIG. 2.

The example bearing assembly 100 includes an inner race 32 secured around the shaft 20. The inner race 32 has an axial dimension along the shaft. The inner race forms a collar around the shaft 20. The inner race 32 may be formed of two parts which are clamped together to form the collar around the shaft 20.

In the illustrated example, associated with the inner race 32 are two clamp rings 34a and 34b. One clamp ring 34a is disposed at one axial end of the inner race 32, and the other clamp ring 34b is disposed at the other axial end of the inner race 32. A space is provided between the two clamp rings. The inner race 32 preferably has a lip at its respective ends to provide a positioning location for the clamp rings 34a and 34b. A central lip or lips may also be provided on the inner race 32 so as each clamp ring 34a, 34b is positioned between a central lip and an outer radial lip. The clamp rings 34a and 34b clamp the inner race 32 to the shaft, and are annular clamp rings formed around the inner race 32.

Each clamp ring 34a and 34b may be formed of two parts which are connected together around the inner race 32.

In the illustration of FIG. 2 the inner race 32 and the clamp rings 34a, 34b are distinct elements. The structure is not limited to these specifics though, and for example the inner race and the clamp rings could be formed of a single piece of material.

An opening is formed between the clamp rings 34a and 34b. In this opening, between the clamp rings 34a and 34b, the inner race preferably extends radially away from the shaft 20, to provide a surface which is raised relative to the surfaces of the inner race with which the clamp rings engage.

A cage and rolling element assembly 40 is positioned within this opening. Reference numerals 40a and 40b denote the edges of the cage. The cage and rolling element assembly may be formed in a number of ways, and in this example includes a plurality of rolling elements 42 positioned around the circumference of the cage. The reference numerals 40a and 40b denote the circumferential edges of the cage within which the rolling elements 42 are housed.

The cage and rolling element assembly 40 is configured to rotate around the inner race 32, between the clamp rings 34a and 34b. The inner race is fixed to the shaft by the clamp rings 34a and 34b, and rotates in accordance with rotation of the shaft 20.

An outer race (fixed bearing) 80 is also shown, which is held within a cartridge 60 and provides a running surface for the rolling elements of the cage and rolling element assembly 40. The outer race 80 in this example is positioned around the rolling elements of the cage and rolling element assembly. The outer race 80 as illustrated extends along the length of the rolling elements.

The cartridge 60 is a housing for the roller bearing cage.

The outer race 80 engages with and is accommodated in an appropriately shaped opening in the surface of the cartridge 60, denoted by reference numeral 62. This engagement rigidly holds the outer race 80.

The operation is as follows.

The shaft 20 rotates, and the inner race 32 correspondingly rotates. The cage and rolling element assembly 40 rotates around the inner race. The outer race 80 is fixed relative to the cartridge 60.

The rolling elements are driven by the rotation of the inner race 32 and hence also by the shaft 20 rotation. As the shaft 20 rotates, the inner race 32 which is clamped to it rotates at the same rotational speed, and this in turn causes the rolling elements 42 to rotate—as they are in contact with the inner race 32. As the rolling elements 42 rotate they in turn begin to travel along the surface of the outer race 80 as they are also in contact with the outer race 80 as well as the inner race 32. As the outer race 80 is held stationary within the cartridge 60, the rolling elements 42 (and hence the cage within which they are held) begin to travel around the outer race 80 in the same rotational direction as the inner race 32 and shaft 20.

The example illustrates a free rolling element bearing arrangement. In an alternative, a fixed rolling element bearing cage may be provided, in which the outer race has grooves/lips formed around the rolling element end faces.

In the free rolling element bearing arrangement as shown in FIGS. 1 and 2, the interface of the clamping ring lips with the end faces of the rolling elements acts to axially locate the rolling elements and hence the cage and rolling element assembly within which they are contained. The whole rolling element bearing assembly is otherwise free to axially move along the outer race, which is desirable to allow for the free rolling element bearing assembly to be mounted and allow thermal expansion of the shaft to which it is fitted when the shaft is also held in place by a fixed bearing at a distance away from the free bearing position. Only one fixed bearing is provided on a continuous shaft, and all other support bearings have to be free bearings to allow for this expansion of the shaft with temperature.

The free bearing arrangement of FIGS. 1 and 2 is able to handle applied axial forces via the use of thrustwashers added to the cartridge that allow applied axial loads to be reacted to by an interface with the edges of the clamping rings and the faces of the added thrustwashers, as described in U.S. Pat. No. 10,294,992 herein incorporated by reference. As illustrated in FIGS. 1 and 2 the cartridge 60 is provided with two annular grooves 90a, 90b formed in the inner circumference thereof. Two thrustwashers 92a, 92b engage with the annular grooves formed in the cartridge 60. The thrustwashers are secured within the housing, and prevented from rotating under the applied axial load. The applied axial load, applied to the shaft, and hence the inner race, and hence to the clamping rings, is now reacted to by the interface of the end faces of the clamping rings and the thrustwashers, not by the interfaces of the clamping ring lips/roller end faces and roller end faces/outer race grooves/lips. Each thrustwasher 92a, 92b has an outer circumference 52a, 52b, which as noted above defines a diameter for each thrustwasher which is greater than the outer diameter of the clamp rings 34a, 34b, and which is also greater than the outer diameter of the cage and rolling element assembly 40 (with rolling elements) and outer race. The need to be greater than the outer diameter of the cage and rolling element assembly is not necessary. All that is needed is for there to be an interface between the clamping rings and the thrustwashers, which has no relevance to the cage and rolling element assembly.

The planar outer race in the modified bearing provides the rolling element surface to deal with the applied radial load. The thrustwashers are used to handle applied axial load. It is desirable that there is an overlap between the inner diameter of the thrustwashers and the outer diameter of the clamping rings to enable interface surfaces between the thrustwasher and clamping rings. The dimensions of the cage and rolling element assembly are irrelevant, but the clamp ring outer diameter is greater than the thrustwasher inner diameter.

The outer circumference of the thrustwashers is positioned within the cartridge 60. As is shown in the figures, the outer circumference portions 52a, 52b of the thrustwashers 92a, 92b are accommodated in the annular grooves 90a, 90b of the cartridge 60.

The thrustwashers 92a, 92b are maintained in a fixed relationship with respect to the cartridge 60, and this ensures positioning of the clamping rings (and hence shaft 20) in a particular axial position.

The thrustwashers are accommodated rigidly in the housing, and they cannot rotate with respect to the housing.

The thrustwashers effectively convert the free bearing arrangement of into a fixed bearing equivalent, with axial load being handled by the interface of the thrustwasher upon the clamping ring surface, instead of the interface of the end face of the rolling elements against the fixed bearing outer race lip.

Whilst the example is of providing a thrustwasher, alternatively there may be provided an adjacent thrust rolling element bearing.

FIGS. 1 and 2 illustrate an example of a bearing assembly, but the invention is not limited to such an example bearing assembly.

Figure 3:
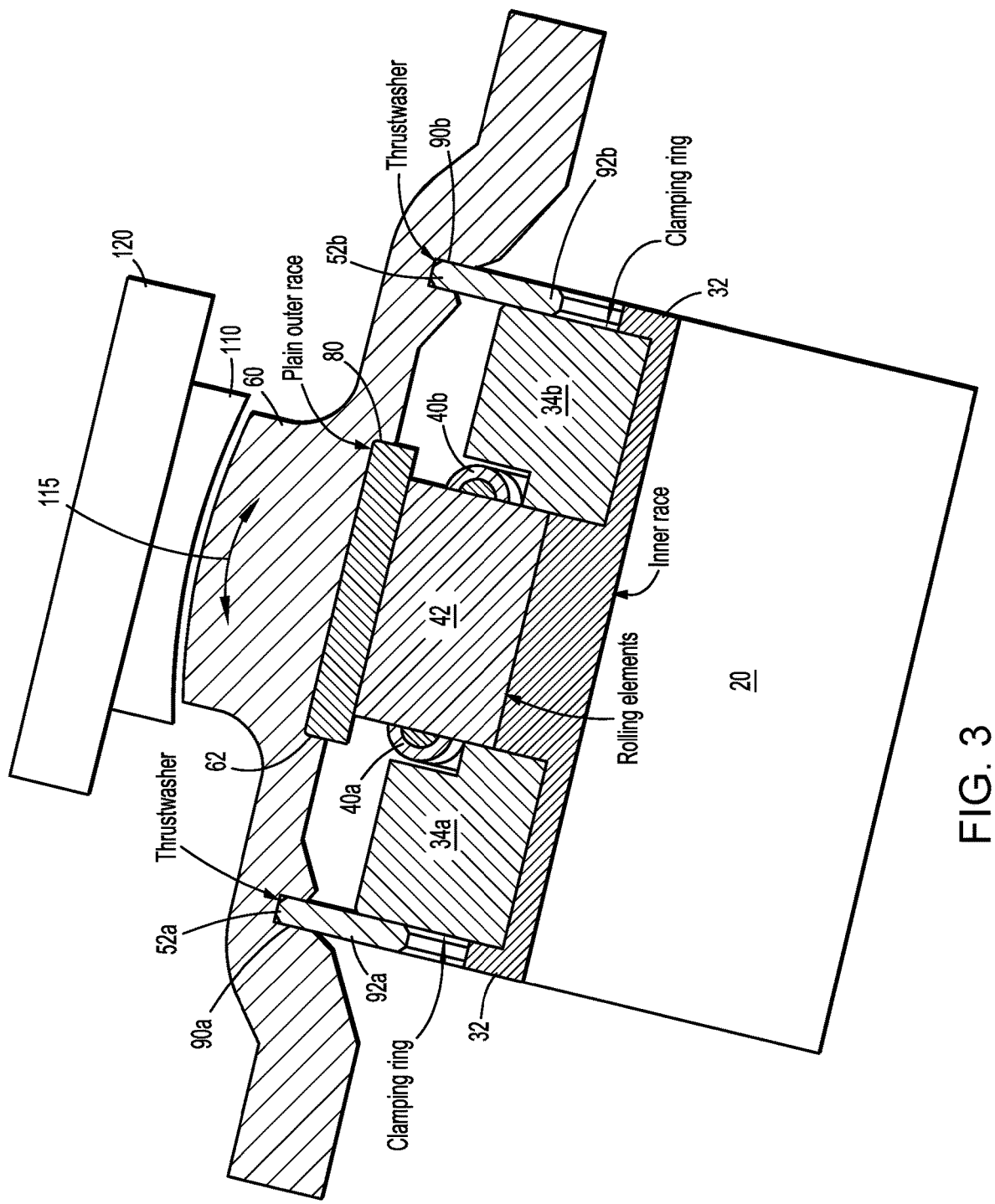
FIG. 3 illustrates a bearing assembly mounted in a seating ring and an outer housing.

With reference to FIG. 3, there is illustrated an improvement to the roller bearing assembly of FIGS. 1 and 2.

A seating ring 110 is provided, which is configured to fit around the bearing assembly 100. A housing 120 is configured to fit around the seating ring 110. The seating ring 110 is a split seating ring, formed of two or more parts, so it can be formed around the split bearing assembly. Similarly the housing 120 is a split housing, formed of two or more parts.

The inner circumference of the seating ring 110 is shaped to have a concave surface between its two outer edges, such that a bearing assembly having a convex outer surface on its cartridge 60, can be positioned within the seating ring 110, and be held in place but with some movement allowed, as denoted by arrow 115. This movement cam be in any axis.

The housing 120 is an overall housing for the arrangement, which encloses the arrangement.

The function of the seating ring is described further below with reference to FIGS. 5A, 5B, 6A and 6B.

Figure 4:
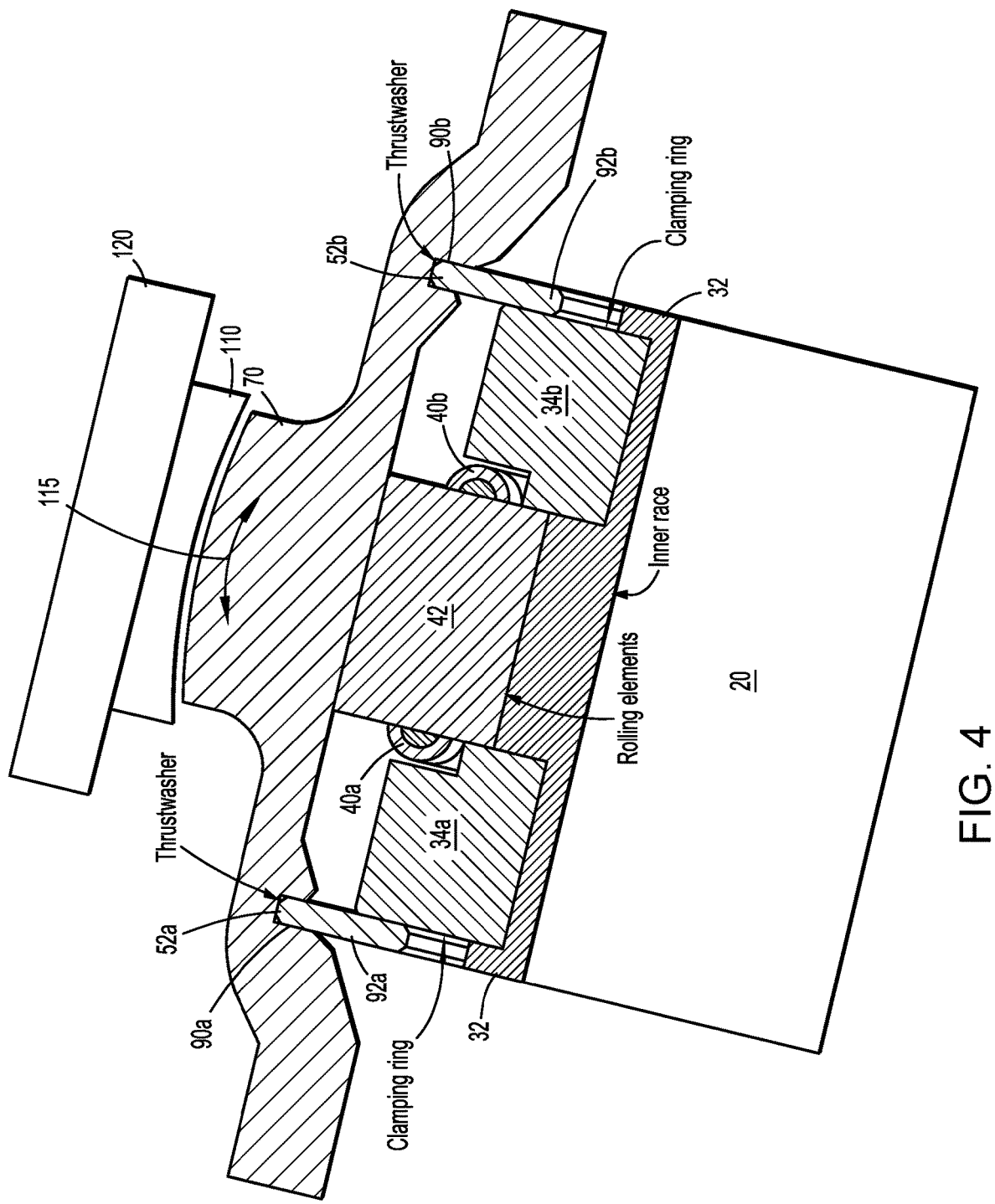
FIG. 4 illustrates an alternative bearing assembly mounted in a seating ring and an outer housing.

With reference to FIG. 4, there is illustrated an alternative to the improved roller bearing assembly of FIG. 3, in which the cartridge and the outer race 80 are integrated into a single element. As shown in FIG. 4 a modified cartridge 70 is provided, and the rolling elements 42 of the cage and rolling element assembly 40 directly engage with the surface of this cartridge 70.

The material of the cartridge 70 in FIG. 4 is the same as the material of the outer race 80 in FIG. 3. By integrating the cartridge and outer race in this way, there is no requirement to accommodate a separate outer race.

In the arrangement of FIGS. 1 to 3 the outer race 80 is formed of a suitable material to facilitate the interaction with the rolling elements, and the main cartridge is formed of any suitable material for a housing. In FIG. 4 the whole cartridge 70 is formed of the material to facilitate interaction.

The inner and outer races are typically formed of steel or stainless teel and hardened. The cartridge is typically formed of cast iron, stainless steel or aluminium.

Where the whole cartridge is formed of a material to facilitate the functionality of the outer race, it may be formed of steel or stainless steel and hardened. Preferably in such an implementation the cartridge may be formed of bearing steel.

By integrating the cartridge and outer race in this way, the overall diameter dimension of the bearing assembly 100 may be reduced, as there is no longer a requirement to provide for the protrusion of the outer race 80.

It should be understood that the drawings are not to scale.

With reference to FIGS. 5A and 5B, there is illustrated an illustration of the seating ring 110. FIG. 5A illustrates a side-on view, and FIG. 5B illustrates a cross-section view through A-A in FIG. 5A. The housing 120 is not shown in FIGS. 5A and 5B for ease of illustration.

The purpose of the seating ring 110 is for seating a bearing assembly, such as the example bearing assembly of FIG. 3.

As can be seen in FIG. 5A, the seating ring 110 generally provides a ring which can be formed around the bearing assembly.

As can be seen in FIG. 5B, the bearing assembly can sit within the seating ring and be accommodated within the inner circumference 112 of the seating ring 110.

The inner circumference 112 of the seating ring 110 is shaped to have a concave surface between its two outer edges, such that a bearing assembly can be positioned within the seating ring 110, and be held in place but with some movement allowed. An inner diameter D2 of the seating ring 110 is larger than an outer diameter D1 of the seating ring.

Figure 6A:
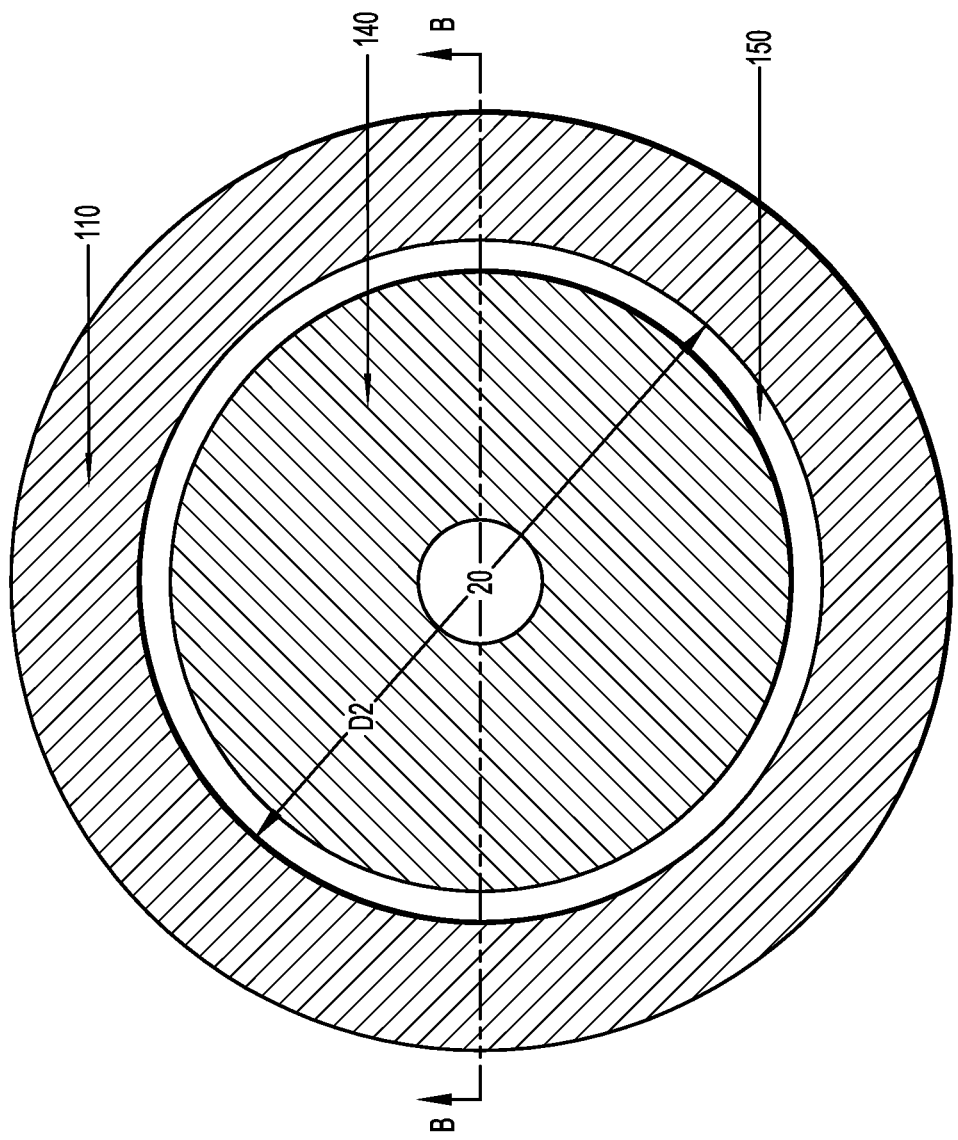
FIGS. 6A and 6B illustrate the seating ring of FIG. 3 or FIG. 4 with a bearer assembly in situ.
Figure 6B:
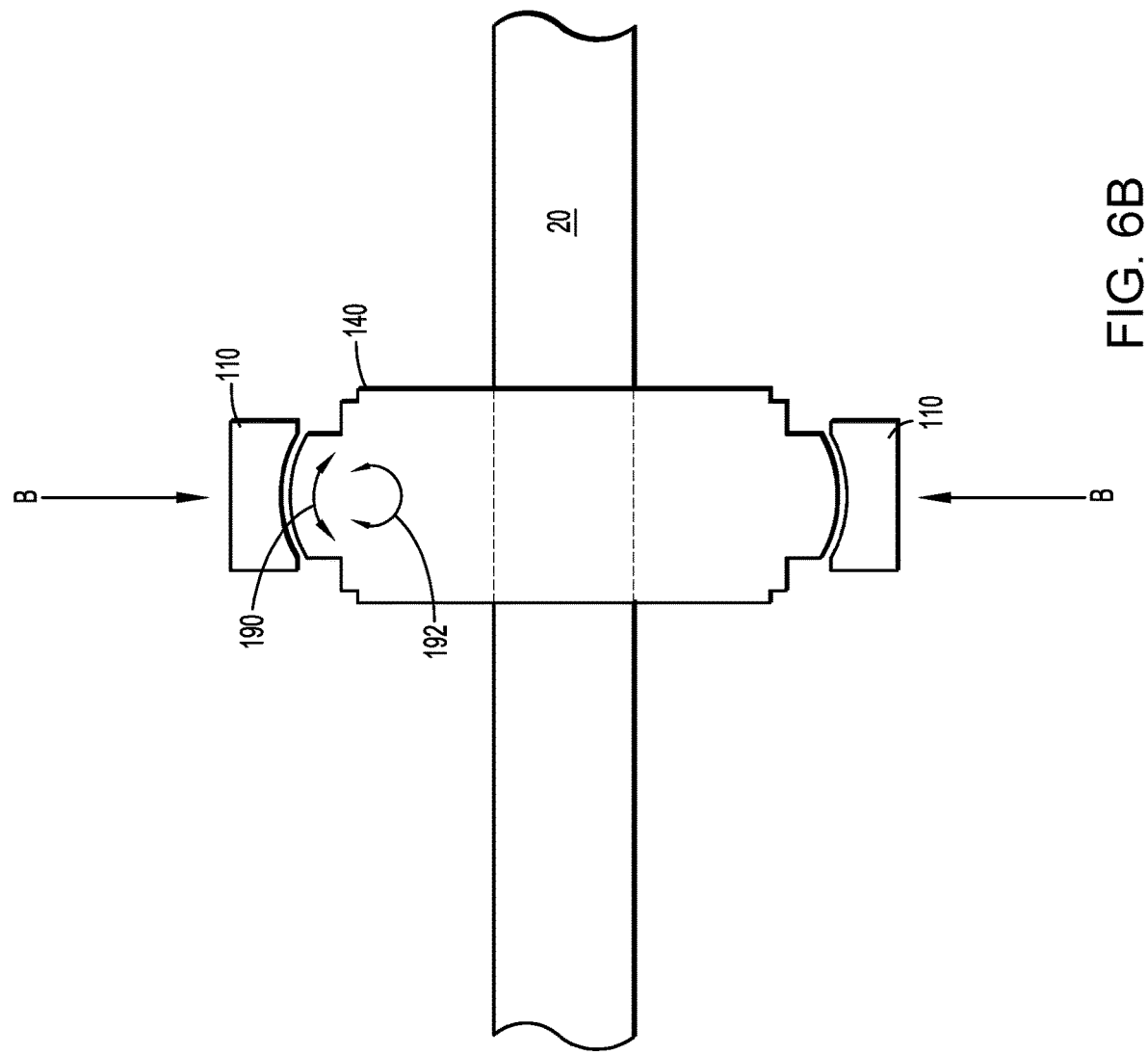

With reference to FIGS. 6A and 6B, there is illustrated the seating ring 110 with a bearing assembly 140 in situ. FIG. 6A illustrates a side on view of the seating ring 110 with the bearing assembly in situ, and FIG. 6B illustrates a cross-section view through B-B in FIG. 6A of the seating ring 110 with the bearing assembly in situ. The housing 120 is not shown in FIGS. 6A and 6B for ease of illustration. The bearing assembly is not shown in detail, and is generally denoted by reference numeral 140. The bearing assembly may be in accordance with the details of FIG. 3 or 4, but is not limited to this arrangement.

As can be seen in FIG. 6A, the bearing assembly 140 generally sits in the seating ring 110. The inner diameter of the seating ring 110 shown in FIG. 6A is the larger inner diameter $D_2$. A gap 150 is shown between the outer circumference of the bearing assembly 140 and the inner circumference of the seating ring 110. This gap permits relative movement of the bearing assembly relative to the seating ring, as will be discussed below. The bearing assembly is kept within the seating ring, by the smaller inner diameter $D_1$ of the seating ring at its edges as shown in FIG. 5B.

FIG. 6B illustrates the bearing assembly 140, having the general outer shape of the bearing assembly cartridge 60 of FIG. 3. As can be seen, a central portion of this cartridge is accommodated within the inner concave circumference of the seating ring 110. The bearing assembly preferably has an outer convex shape to allow a complimentary fit with the concave shape of the inner circumference of the seating ring 110.

The arrows 190 and 192 denote relative movement of the bearing assembly 140 relative to the seating ring 110. This relative movement can be in any direction—in the x, y, z axis directions.

The split seating ring enables an existing split roller bearing (with parallel rollers such as shown in FIGS. 1 to 4) to follow the alignment of the shaft. Maintaining the use of parallel rollers allows the design to take more radial load than bearing assemblies without the parallel rollers, and to take considerably more axial load in both directions. The split bearing cage enables bearing replacement in a fraction of the time needed to replace existing roller bearings with elliptical rollers.

The split seating ring 110 is preferably securely fixed in use by enclosing it within a fixed structure (housing 120 in FIG. 3 for example). The bearing assembly is mounted to sit in the seating ring as shown in FIGS. 6A and 6B, such that the bearing assembly can move relative to the seating ring to accommodate for misalignment.

Typically the seating ring is fixed to a housing within which the shaft 20 is mounted.

Figure 7:
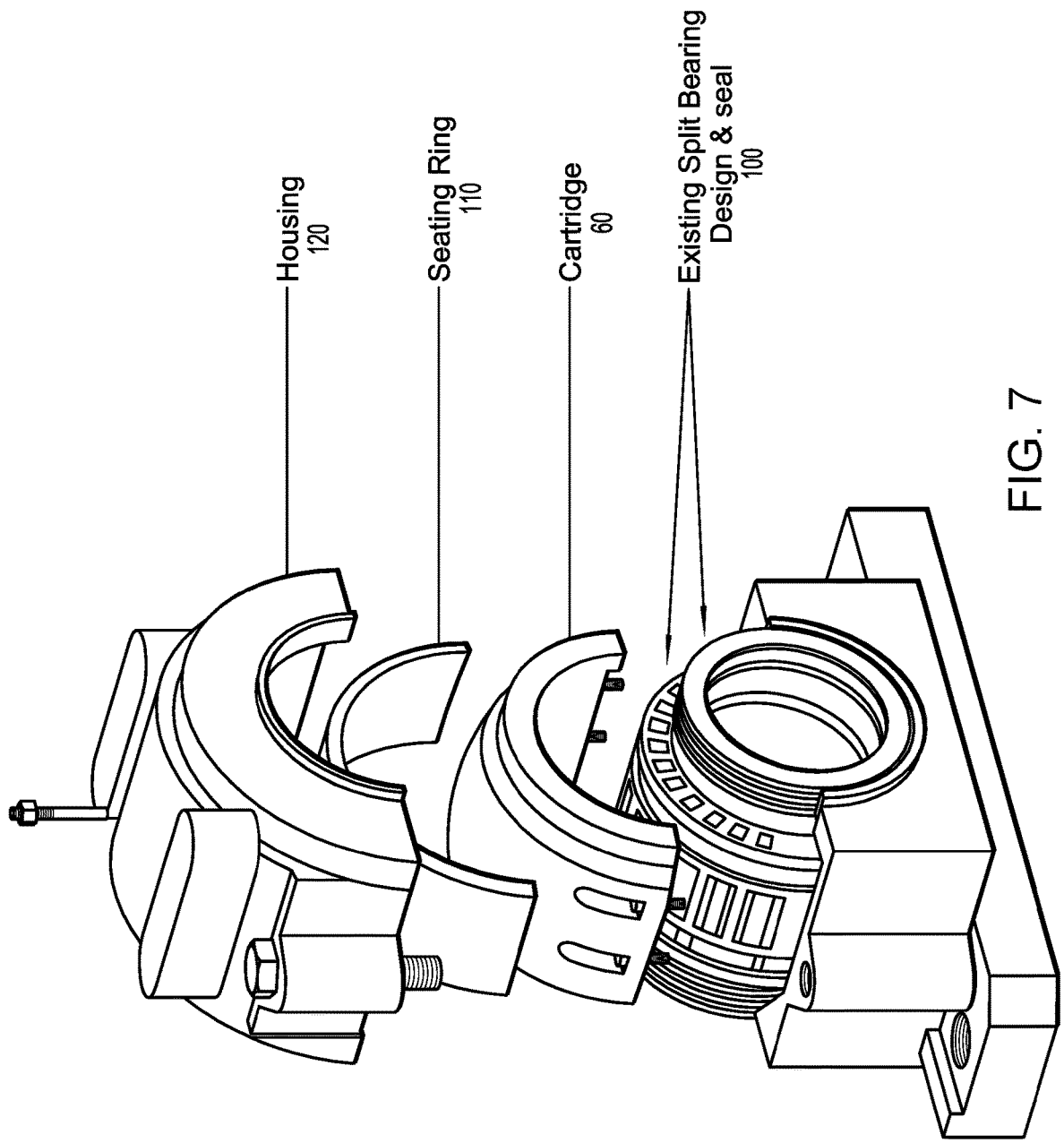
FIG. 7 illustrates an arrangement of a bearing assembly mounted in a housing including a seating ring.

With reference to FIG. 7, there is illustrated an example overall assembly of a bearing cage and spherical outer race or seating ring to accommodate for misalignment, as discussed above.

As shown in FIG. 7, the bearing assembly 100 is housed within the cartridge 60. The bearing cage as shown also includes a seal, as described in WO 2019 058090 the contents of which are herein incorporated by reference. The seating ring 110 is arranged around the cartridge 60. The housing 120 is arranged around the seating ring 110.

As can be seen from FIG. 7, the housing 120 is a split housing having two or more parts, and can be fixed in position, and may have a base 192 which can be fixably attached to a structure in which a shaft is provided.

The outer diameter dimensions of the apparatus of FIG. 4, including the bearing assembly, cartridge, and seating ring 110 may be the same as the outer diameter dimension of the apparatus of FIG. 2 including the bearing assembly and the cartridge 60. This is due to the incorporation of the outer race 80 into the cartridge 60. This means that the apparatus of FIG. 4 may be accommodated in the same outer housing 120 as the bearing assembly of FIG. 2, and the outer housing may not have to be redesigned (resized), and the arrangement of FIG. 4 can be installed in the same space as is provided for the arrangement of FIG. 2.

All described components are preferably split components, so that they can be positioned around a shaft in situ, for example to replace an existing bearing cage in a system. All components are thus preferably split component parts, formed of two or more pieces, to enable them to be fitted around a shaft.

For a bearing assembly that is retro-fitted to an existing system, for example as a repair, the spacing available to fit the seating ring may be fixed—there may be a fixed dimension between the shaft and the fixed structure to which it is to be mounted. By integrating the outer race and the cartridge as shown in FIG. 4, the overall diameter of the bearing assembly can be reduced to allow the bearing assembly and seating ring in combination to be housed within a given spacing.

All components are split component parts, formed of two or more pieces, to enable them to be fitted around a shaft.

The seating ring 110 may also be referred to as a seating sleeve, a split outer spherical seating sleeve or a split outer spherical seating ring.

Example applications of the improved arrangement as described include, but are not limited to: marine engine transmission, automotive transmission, truck transmissions, agricultural and construction equipment, pumps and compressors, and two-cycle engines such as marine outboards and garden equipment; grinding mill pinion shafts; conveyor head, tail and take-up pulleys; screw conveyors; PUG mills; sinter breakers; jaw crushers; marine propeller shafts; ID fans; ventilation fans; under heat fans; flocculator drives; stacker/reclaimer bucket wheels; vertical mills; horizontal/vertical dryers; turbines; rake drives; screw mixers (single/twin screw); rotary kiln drives and trunnions; and thickener drives.

The invention has been described with reference to particular examples, features of which may be combined. Not all described features are essential.

The invention claimed is:

1. A roller bearing assembly arrangement comprising:
   i) a split bearing assembly comprising:
      a split inner race for attaching to a rotating shaft;
      a split cage and rolling element assembly positioned around the inner race;
      a split cartridge around the bearing assembly having an integrated outer race on an inner surface for the cage and rolling element assembly; and
      an outer surface with a convex profile;
   ii) a split seating ring having an inner surface with a concave profile, the split seating ring being fitted around the bearing assembly such that the convex profile of the outer surface of the split cartridge fits within the concave profile of the inner surface of the split seating ring, wherein the fit between the split cartridge and the split seating ring allows for the split cartridge to move relative to the split seating ring to compensate in use for shaft misalignment; and
   iii) a split housing having an inner surface fitted around the split seating ring, comprising a gap between an inner portion of the inner surface of the split seating ring and the outer surface of the split bearing assembly.

2. The roller bearing assembly arrangement of claim 1, further comprising a first positional locator and a second positional locator for positioning the cage and rolling element assembly between inner edges thereof.

3. The roller bearing assembly arrangement of claim 2, wherein the split bearing assembly further comprises a thrustwasher adjacent an outer edge of one of the first positional locator and the second positional locator and fixably connected to the split cartridge.

4. The roller bearing assembly arrangement of claim 3, wherein the split bearing assembly further comprises an additional thrustwasher adjacent to an outer edge of the other one of the first positional locator and the second positional locator and fixably connected to the split cartridge.

5. The roller bearing assembly arrangement of claim 3, wherein the thrustwasher has an outer circumference with a first diameter and an inner circumference with a second diameter, the second diameter being smaller than the first diameter.

6. The roller bearing assembly arrangement of claim 5, wherein the inner circumference of the thrustwasher is smaller than an outer circumference of at least one of the first positional locator and the second positional locator, wherein said at least one of the first positional locator and the second positional locator is shaped to allow the thrustwasher to be located adjacent said at least one of the first positional locator and the second positional locator and around the inner race.

7. The roller bearing assembly arrangement of claim 2, wherein the first positional locator comprises a first protrusion on the inner race and the second positional locator comprises a second protrusion on the inner race.

8. The roller bearing assembly arrangement of claim 2, wherein the first positional locator comprises a first clamping ring for clamping the inner race to the rotating shift and the second positional locator comprises a second clamping ring for clamping the inner race to the rotating shaft.

9. The roller bearing assembly arrangement of claim 2, wherein the first positional locator comprises a first circumferential protrusion around the inner race and the second positional locator comprises a second circumferential protrusion around the inner race.

10. The roller bearing assembly arrangement of claim 9, wherein the first circumferential protrusion and the second circumferential protrusion are spaced apart from each other by a distance to accommodate the cage and rolling element assembly.

11. The roller bearing assembly arrangement of claim 2, wherein the inner race comprises a circumferential protrusion between the first positional locator and the second positional locator, the circumferential protrusion providing a diameter dimension to accommodate the cage and rolling element assembly.

12. The roller bearing assembly arrangement of claim 1, wherein the split cage and rolling element assembly is rotatable with respect to the inner race.

13. The roller bearing assembly arrangement of claim 1, wherein the split bearing assembly comprises a set of parallel rollers.

14. The roller bearing assembly arrangement of claim 1, wherein the outer race and the split cartridge are formed of the same material.

15. The roller bearing assembly arrangement of claim 14, wherein the outer race is a portion of the split cartridge with which rollers engage.

16. The roller bearing assembly arrangement of claim 1, wherein a first portion of the inner surface of the split seating ring between outer edges of the split seating ring has a first diameter, and wherein a second portion of the inner surface of the split seating ring at the outer edges has a second diameter, the second diameter being less than the first diameter.

17. The roller bearing assembly arrangement of claim 1, wherein the split seating ring has an outer surface with a flat profile between axial ends.

18. The roller bearing assembly arrangement of claim 1, wherein the split seating ring has an outer surface with a profile of a constant diameter between axial ends.

* * * * *